United States Patent
Woo et al.

(10) Patent No.: US 11,516,039 B2
(45) Date of Patent: Nov. 29, 2022

(54) PERFORMANCE MODE CONTROL METHOD AND ELECTRONIC DEVICE SUPPORTING SAME

(71) Applicant: Samsung Electronics Co., Ltd., Suwon-si (KR)

(72) Inventors: Kyounggu Woo, Suwon-si (KR); Inchoon Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 16/971,110

(22) PCT Filed: Mar. 6, 2019

(86) PCT No.: PCT/KR2019/002569
§ 371 (c)(1),
(2) Date: Aug. 19, 2020

(87) PCT Pub. No.: WO2019/172632
PCT Pub. Date: Sep. 12, 2019

(65) Prior Publication Data
US 2020/0382331 A1      Dec. 3, 2020

(30) Foreign Application Priority Data

Mar. 8, 2018 (KR) .................. 10-2018-0027223

(51) Int. Cl.
*H04L 12/28* (2006.01)
*G06F 3/16* (2006.01)
(Continued)

(52) U.S. Cl.
CPC ............ *H04L 12/282* (2013.01); *G06F 3/167* (2013.01); *G10L 15/04* (2013.01); *G10L 15/22* (2013.01); *G10L 2015/223* (2013.01)

(58) Field of Classification Search
None
See application file for complete search history.

(56) References Cited

U.S. PATENT DOCUMENTS

| 5,630,148 A | 5/1997 | Norris |
| 6,728,677 B1 | 4/2004 | Kannan et al. |

(Continued)

FOREIGN PATENT DOCUMENTS

| JP | 2006-302306 A | 11/2006 |
| KR | 10-2006-0008983 A | 1/2006 |

(Continued)

OTHER PUBLICATIONS

Hybrid Dynamic Thermal Management: Based on Statistical Characteristics of Multimedia Applications; Dept. of Computer Science, Texas A&M University; College Station, Texas, USA; Aug. 13, 2008.

(Continued)

*Primary Examiner* — Jonathan C Kim
(74) *Attorney, Agent, or Firm* — Jefferson IP Law, LLP

(57) ABSTRACT

An embodiment of the present invention comprises: a communication module for communicating with at least one external device; a microphone for receiving a user utterance; a memory for storing performance mode information having been configured in the electronic device; and a processor electrically connected to the communication module, the microphone, and the memory, wherein the processor is configured to: receive, through the microphone, a second user utterance associated with task execution; transmit first data associated with the second user utterance to an external device; receive, from the external device, second data associated with at least a part of processing of the first data; identify a first work load allocated to the electronic device at the time of receiving the second data; and compare a second work load required for processing the second data (Continued)

and the first work load, so as to control the performance mode. In addition, various embodiments recognized through the specification are possible.

11 Claims, 12 Drawing Sheets

(51) Int. Cl.
*G10L 15/04* (2013.01)
*G10L 15/22* (2006.01)

(56) References Cited

U.S. PATENT DOCUMENTS

| | | | |
|---|---|---|---|
| 7,356,726 B2 | 4/2008 | Shimoyama et al. | |
| 9,779,732 B2 | 10/2017 | Lee et al. | |
| 10,101,875 B2 | 10/2018 | Kim et al. | |
| 2006/0212247 A1* | 9/2006 | Shimoyama | G06F 1/3203 702/89 |
| 2007/0043574 A1* | 2/2007 | Coffman | H04L 67/02 704/E15.04 |
| 2008/0065869 A1* | 3/2008 | Kim | G06F 9/4893 712/229 |
| 2013/0339858 A1* | 12/2013 | Corfield | G06F 3/167 715/728 |
| 2014/0082543 A1* | 3/2014 | Kim | G06F 9/4818 715/771 |
| 2014/0244712 A1* | 8/2014 | Walters | G06Q 10/10 709/202 |
| 2014/0278435 A1* | 9/2014 | Ganong, III | G10L 15/22 704/275 |
| 2015/0378753 A1* | 12/2015 | Phillips | G06F 9/505 718/1 |
| 2016/0148615 A1* | 5/2016 | Lee | G06F 1/3215 704/275 |
| 2018/0096283 A1* | 4/2018 | Wang | G06Q 10/063112 |
| 2020/0152195 A1* | 5/2020 | Sarikaya | G06F 40/295 |
| 2020/0382331 A1* | 12/2020 | Woo | G10L 15/04 |

FOREIGN PATENT DOCUMENTS

| | | |
|---|---|---|
| KR | 10-2008-0023548 A | 3/2008 |
| KR | 10-2012-0066561 A | 6/2012 |
| KR | 10-2016-0064258 A | 6/2016 |

OTHER PUBLICATIONS

Predictive Dynamic Thermal Management for Multicore Systems;Department of Computer Science,Texas A&M University College Station, TX 77840; Jun. 13, 2008.

Effective Dynamic Thermal Management for MPEG-4 Decoding; Department of Computer Science Texas A&M University, College Station, TX 77840; Oct. 10, 2007.

Korean Office Action dated Oct. 12, 2022, issued in Korean Patent Application No. 10-2018-0027223.

* cited by examiner

PERFORMANCE MODE CONTROL METHOD AND ELECTRONIC DEVICE SUPPORTING SAME

TECHNICAL FIELD

Various embodiments disclosed in this specification relate to a technology for controlling a performance mode of an electronic device.

BACKGROUND ART

For the purpose of aiming interaction with a user, recent electronic devices have suggested various input methods. For example, an electronic device may support a voice input method that receives voice data according to user utterance, based on the execution of a specified application program. Furthermore, the electronic device may recognize the received voice data to derive the intent of a user utterance and may support a speech recognition service for performing a task corresponding to the derived intent of the user utterance.

DISCLOSURE

Technical Problem

With regard to the processing of voice data according to a user utterance, an electronic device may perform a series of sequences. For example, to perform a task corresponding to the derived intent of a user utterance, the electronic device may control a functional operation of a related application program or may perform a sequence of loading or collecting related content. Accordingly, it may take a predetermined time for the electronic device to respond to the user utterance (e.g., performing a task), which will be understood as a user's waiting time for the response of the electronic device. Such the response waiting time of the user is directly related to the data processing speed or data throughput of the electronic device. Accordingly, when a low performance mode is set for the electronic device, the response waiting time increases, and thus the user's reliability for the operation of a voice recognition service may be reduced.

Various embodiments disclosed in the disclosure may provide a method for variably controlling a performance mode of an electronic device, when a voice recognition service is operated, and an electronic device supporting the same.

Technical Solution

According to an embodiment, an electronic device may include a communication module for communicating with at least one external device, a microphone for receiving a user utterance, a memory for storing information about a performance mode set for the electronic device, and a processor electrically connected to the communication module, the microphone, and the memory.

According to an embodiment, the processor may be configured to receive a first user utterance associated with execution of a task through the microphone, to transmit first data associated with the first user utterance to an external device, to receive second data associated with processing at least part of the first data from the external device, to identify a first work load allocated to the electronic device at a time of receiving the second data, and to compare a second work load required to process the second data with the first work load to control the performance mode.

According to an embodiment, a method of controlling a performance mode of an electronic device may include receiving a first user utterance associated with execution of a task, through a microphone mounted in the electronic device, transmitting first data associated with the first user utterance to an external device, receiving second data associated with processing at least part of the first data from the external device, identifying a first work load allocated to the electronic device at a time of receiving the second data, and comparing a second work load required to process the second data with the first work load to control the performance mode of the electronic device.

Advantageous Effects

According to various embodiments, the response speed of an electronic device for a user utterance may be improved.

According to various embodiments, the sense of incompatibility for the operation of a voice recognition service may be reduced, or the reliability may be improved, by shortening a response waiting time of a user.

Besides, a variety of effects directly or indirectly understood through the disclosure may be provided.

DESCRIPTION OF DRAWINGS

With regard to the description of drawings, the same reference numerals may be assigned to the same or corresponding components.

MODE FOR INVENTION

Figure 1A:
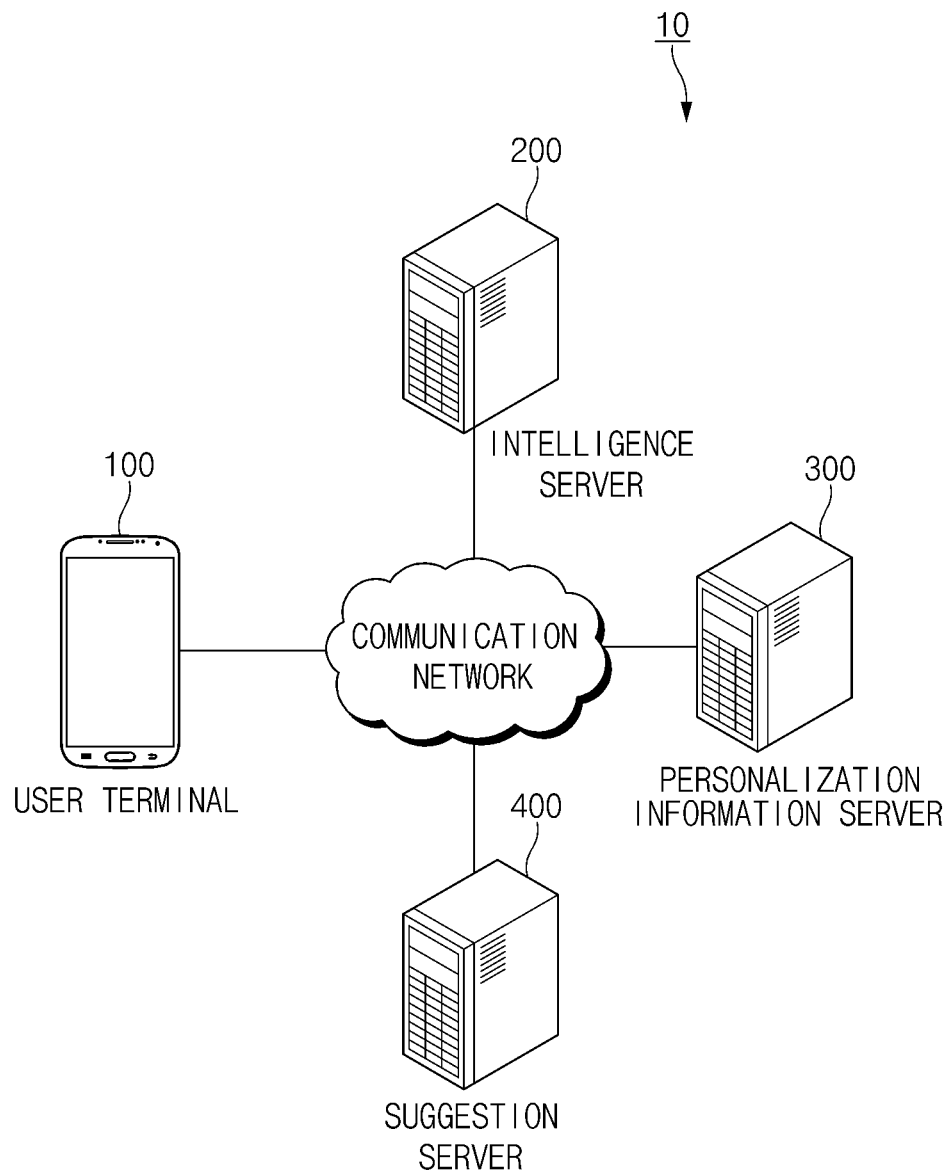
FIG. 1A is a diagram illustrating an integrated intelligence system, according to an embodiment.

Hereinafter, various embodiments of the disclosure will be described with reference to accompanying drawings.

However, it should be understood that the disclosure is not intended to be limited to a specific embodiment, but intended to include various modifications, equivalents, and/or alternatives of the corresponding embodiment. With regard to description of drawings, similar components may be marked by similar reference numerals.

In this specification, the expressions 'have', 'may have', 'include' and 'comprise', or 'may include' and 'may comprise' used herein indicate existence of corresponding features (e.g., elements such as numeric values, functions, operations, or components) but do not exclude presence of additional features.

In this specification, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, a first user device and a second user device indicate different user devices regardless of the order or priority. For example, without departing the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. In some cases, even if terms are terms which are defined in the specification, they may not be interpreted to exclude embodiments of the disclosure.

According to various embodiments of the disclosure, an electronic device may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, or the like.

According to another embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. According to an embodiment, an electronic device may be a flexible electronic device. Furthermore, according to an embodiment of the disclosure, an electronic device may not be limited to the above-described electronic devices and may include other electronic devices and new electronic devices according to the development of technologies.

Hereinafter, according to various embodiments, electronic devices will be described with reference to the accompanying drawings. The term "user" used herein may refer to a person who uses an electronic device or may refer to a device (e.g., an artificial intelligence electronic device) that uses an electronic device.

Prior to describing the disclosure, an integrated intelligence system to which various embodiments of the disclosure may be applied may be described with reference to FIGS. 1A, 1B, 1C, 1D, and 1E.

FIG. 1A is a diagram illustrating an integrated intelligence system, according to an embodiment.

Referring to FIG. 1A, an integrated intelligence system 10 may include a user terminal 100, an intelligence server 200, a personalization information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. The other app may be executed through the intelligence app of the user terminal 100 and a user input for performing a task may be received. For example, the user input may be received through a physical button, a touch pad, a voice input, a remote input, or the like.

According to an embodiment, the user terminal 100 may receive a user utterance as a user input. The user terminal 100 may receive the user utterance and may generate a command for operating an app based on the user utterance. As such, the user terminal 100 may operate the app, using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the disclosure may mean, but not limited to, the sequence of states, which allows the electronic device to perform the task requested by the user. In other words, the path rule may include information about the sequence of the states. For example, the task may be a certain action that the intelligence app is capable of providing. The task may include the generation of a schedule, the transmission of a picture to the desired counterpart, or the provision of weather information. The user terminal 100 may perform the task by sequentially having at least one or more states (e.g., an operating state of the user terminal 100).

According to an embodiment, the path rule may be provided or generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule among the predefined plurality of path rules or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, on a display. According to another embodiment, the user terminal 100 may execute the action and may not display the result obtained by executing the action on the display. For example, the user terminal 100 may execute a plurality of actions and may display only the result of a part of the plurality of actions on the display. For example, the user terminal 100 may display only the result, which is obtained by executing the last action, on the display. According to another embodiment, the user terminal 100 may receive the input of a user to display the result of executing the action on the display.

The personalization information server 300 may include a database in which user information is stored. For example, the personalization information server 300 may receive the user information (e.g., context information, information about execution of an app, or the like) from the user terminal 100 and may store the user information in the database. The intelligence server 200 may be used to receive the user information from the personalization information server 300 over the communication network and to generate a path rule associated with the user input. According to an embodiment, the user terminal 100 may receive the user information from the personalization information server 300 over the communication network, and may use the user information as information for managing the database.

The suggestion server 400 may include the database storing information about the function in the user terminal 100, the introduction of an application, or the function to be provided. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 1B:
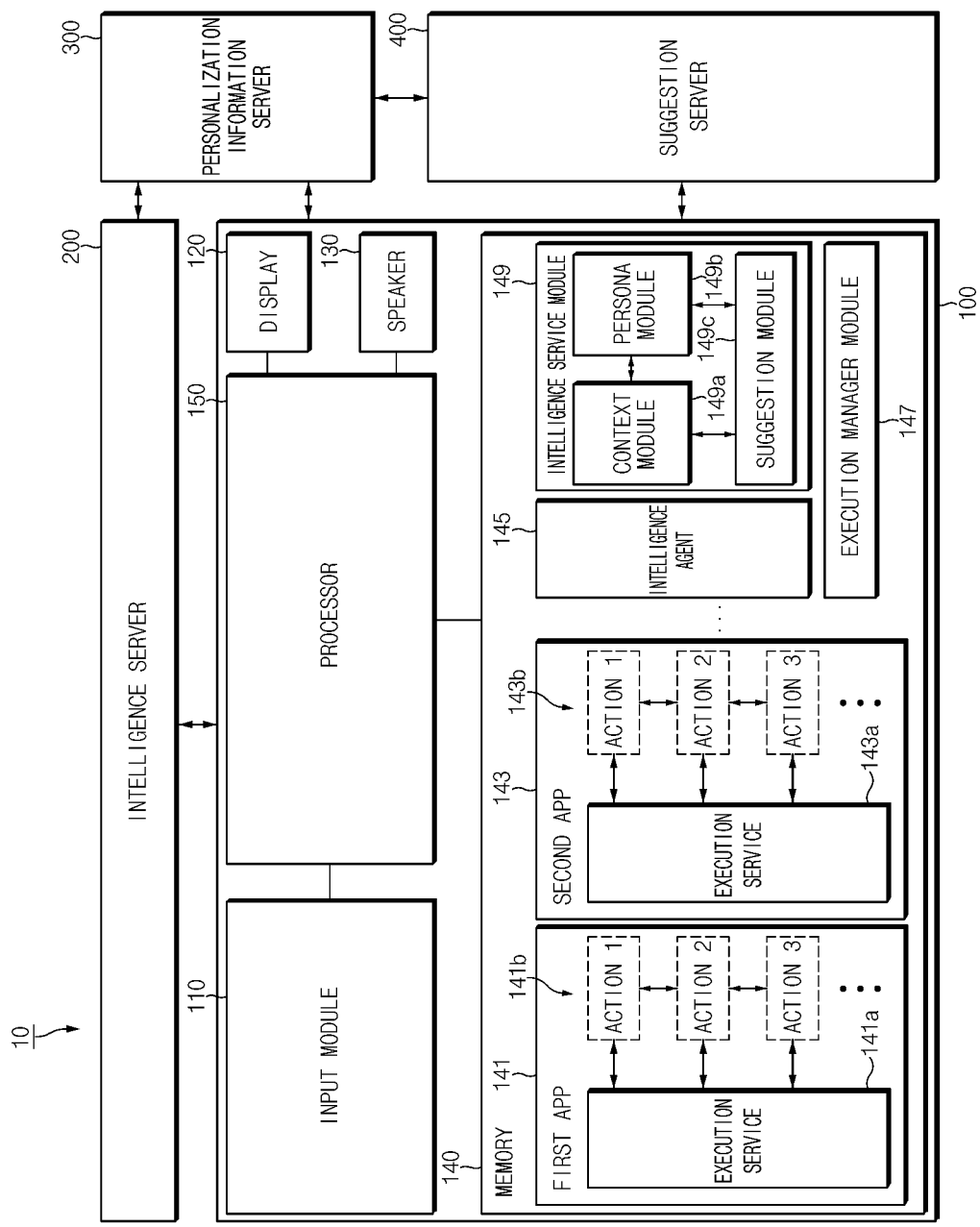
FIG. 1B is a diagram illustrating a user terminal of an integrated intelligence system, according to an embodiment.

FIG. 1B is a diagram illustrating a user terminal of an integrated intelligence system, according to an embodiment.

Referring to FIG. 1B, the user terminal 100 may include an input module 110, a display 120, a speaker 130, a memory 140, or a processor 150. At least part of components of the user terminal 100 (e.g., the input module 110, the display 120, the speaker 130, the memory 140, or the like) may be electrically or operatively connected to the processor 150. The user terminal 100 may further include housing, and components of the user terminal 100 may be seated inside the housing or may be positioned on the housing. The user terminal 100 may further include a communication circuit (or a communication module) positioned inside the housing. The user terminal 100 may transmit or receive data (or signal) to or from an external server (e.g., the intelligence server 200) through the communication circuit. In various embodiments, the user terminal 100 may be referred to as an "electronic device" and may further include components of an electronic device 701 to be described through FIG. 7.

According to an embodiment, the input module 110 may receive a user input from a user. For example, the input module 110 may receive the user input from the connected external device (e.g., a keyboard, a headset, or the like). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone capable of receiving the utterance of the user as a voice signal. For example, the input module 110 may include a speech input system. The input module 110 may receive the utterance of a user as a voice signal through the speech input system. For example, at least part of the microphone may be exposed through one region (e.g., a first region) of the housing. In an embodiment, the microphone may be controlled to be in an always-on state (e.g., always on) to receive an input (e.g., a voice input) according to a user utterance. Alternatively, the microphone may be controlled to operate when user manipulation is applied to a hardware key (e.g., 112 of FIG. 1C) provided to one region of the user terminal 100. The user manipulation may include press to the hardware key 112, press and hold to the hardware key 112, or the like.

According to an embodiment, the display 120 may display an image, a video, and/or an execution screen of an application. For example, the display 120 may display a graphic user interface (GUI) of an app. In an embodiment, at least part of the display 120 may be exposed through a region (e.g., a second region) of the housing to receive an input (e.g., a touch input or a drag input) by a user's body (e.g., a finger).

According to an embodiment, the speaker 130 may output a voice signal. For example, the speaker 130 may output the voice signal, which is generated inside the user terminal 100 or received from an external device (e.g., the intelligence server 200 of FIG. 1A). In an embodiment, at least part of the speaker 130 may be exposed through one region (e.g., a third region) of the housing in association with the output efficiency of the voice signal.

According to an embodiment, the memory 140 may store a plurality of apps (or application programs) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, at least one of the intelligence agent 145, the execution manager module 147, and the intelligence service module 149 may be a framework (or an application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a to perform a function. In other words, the execution service modules 141a and 143a may be activated by the execution manager module 147 of the processor 150, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., when a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may deliver completion information to the execution manager module 147.

According to an embodiment, when the plurality of actions 141b and 143b are respectively executed in the apps 141 and 143, the plurality of actions 141b and 143b may be executed sequentially. When the execution of one action (e.g., action 1 of the first app 141 or action 1 of the second app 143) is completed, the execution service modules 141a and 143a may open the next action (e.g., action 2 of the first app 141 or action 2 of the second app 143) and may deliver the completion information to the execution manager module 147. Here, it is understood that opening an arbitrary action is to transition a state of the arbitrary action to an executable state or to prepare the execution of an arbitrary action. In other words, when the arbitrary action is not opened, the corresponding action may not be executed. When the completion information is received, the execution manager module 147 may deliver the execution request associated with the next action (e.g., action 2 of the first app 141 or action 2 of the second app 143) to the execution service modules 141a and 143a. According to an embodiment, when the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may deliver the execution request of the first action (e.g., action 1 of the second app 143) of the second app 143 to the execution service module 143a.

According to an embodiment, when the plurality of actions 141b and 143b are executed in the apps 141 and 143, the result screen according to the execution of each of the executed plurality of actions 141b and 143b may be displayed on the display 120. According to an embodiment, only the part of a plurality of result screens according to the execution of the executed plurality of actions 141b and 143b may be displayed on the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touchscreen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and may read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input, using the information of the user.

The processor 150 may execute the intelligence agent 145 to transmit the user input received through the input module 110, to the intelligence server 200. The intelligence server 200 may process the user input. According to an embodiment, before transmitting the user input to the intelligence server 200, the processor 150 may execute the intelligence agent 145 to preprocess the user input. This will be described later.

According to an embodiment, the intelligence agent 145 may execute a wakeup recognition module stored in the memory 140 to recognize the call of a user. As such, the processor 150 may recognize the wakeup command of a user through the wakeup recognition module and may execute the intelligence agent 145 for receiving a user input when receiving the wakeup command. The wakeup recognition module may be implemented with a low-power processor (e.g., a processor included in an audio codec). According to various embodiments, when receiving a user input through a hardware key, the processor 150 may execute the intelligence agent 145. When the intelligence agent 145 is executed, an intelligence app (e.g., a speech recognition app) operating in conjunction with the intelligence agent 145 may be executed.

According to an embodiment, the intelligence agent 145 may include a speech recognition module for recognizing the user input. The processor 150 may recognize a user input for executing the operation of the app through the speech recognition module. According to various embodiments, the processor 150 may recognize a restricted user input (e.g., an utterance such as "click" for performing a capture operation when a camera app is being executed) through the speech recognition module. The processor 150 may assist the intelligence server 200 by recognizing and rapidly processing a user command capable of being processed in the user terminal 100, through the speech recognition module. According to an embodiment, the speech recognition module of the intelligence agent 145 for recognizing a user input may be implemented in an app processor.

According to an embodiment, the speech recognition module (or a wake-up recognition module stored in the memory 140) of the intelligence agent 145 may recognize the user utterance, using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may deliver the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149*b*.

According to an embodiment, the processor 150 may execute the execution manager module 147, may receive the path rule from the intelligence agent 145, and may execute the apps 141 and 143; and the processor 150 may allow the apps 141 and 143 to execute the actions 141*b* and 143*b* included in the path rule. For example, the processor 150 may transmit command information (e.g., path rule information) for executing the actions 141*b* and 143*b* to the apps 141 and 143, through the execution manager module 147; and the processor 150 may receive completion information of the actions 141*b* and 143*b* from the apps 141 and 143.

According to an embodiment, the processor 150 may execute the execution manager module 147 to transmit the command information (e.g., path rule information) for executing the actions 141*b* and 143*b* of the apps 141 and 143 between the intelligence agent 145 and the apps 141 and 143. The processor 150 may bind the apps 141 and 143 to be executed depending on the path rule through the execution manager module 147 and may deliver the command information (e.g., path rule information) of the actions 141*b* and 143*b* included in the path rule to the apps 141 and 143. For example, the processor 150 may sequentially transmit the actions 141*b* and 143*b* included in the path rule to the apps 141 and 143, through the execution manager module 147 and may sequentially execute the actions 141*b* and 143*b* of the apps 141 and 143 depending on the path rule.

According to an embodiment, the processor 150 may execute the execution manager module 147 to manage execution states of the actions 141*b* and 143*b* of the apps 141 and 143. For example, the processor 150 may receive information about the execution states of the actions 141*b* and 143*b* from the apps 141 and 143, through the execution manager module 147. For example, when the execution states of the actions 141*b* and 143*b* are in partial landing (e.g., when a parameter necessary for the actions 141*b* and 143*b* are not input), the processor 150 may deliver information about the partial landing to the intelligence agent 145, through the execution manager module 147. The processor 150 may make a request for an input of necessary information (e.g., parameter information) to the user, using the received information through the intelligence agent 145. For another example, when the execution state of each of the actions 141*b* and 143*b* is an operating state, the processor 150 may receive an utterance from the user through the intelligence agent 145. The processor 150 may deliver information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may deliver the received parameter information to the execution manager module 147 through the intelligence agent 145. The execution manager module 147 may change a parameter of each of the actions 141*b* and 143*b* to a new parameter, using the received parameter information.

According to an embodiment, the processor 150 may execute the execution manager module 147 to transmit parameter information included in the path rule to the apps 141 and 143. When the plurality of apps 141 and 143 are sequentially executed depending on the path rule, the execution manager module 147 may deliver the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, when the user utterance specifies a partial app 141 executing a partial action 141*a* but does not specify the other app 143 executing the remaining action 143*b*, the processor 150 may receive a plurality of different path rules, in which the same app 141 (e.g., a gallery app) executing the partial action 141*a* is executed and the different app 143 (e.g., a message app or Telegram app) executing the remaining action 143*b* is executed, through the execution manager module 147. For example, the processor 150 may execute the same actions 141*b* and 143*b* (e.g., the same successive actions 141*b* and 143*b*) of the plurality of path rules, through the execution manager module 150. When the processor 150 executes the same action, the processor 150 may display a state screen for selecting the different apps 141 and 143 respectively included in the plurality of path rules in the display 120, through the execution manager module 147.

According to an embodiment, the intelligence service module 149 may include a context module 149*a*, a persona module 149*b*, or a suggestion module 149*c*.

The context module 149*a* may collect current states of the apps 141 and 143 from the apps 141 and 143. For example, the context module 149*a* may receive context information indicating the current states of the apps 141 and 143 to collect the current states of the apps 141 and 143.

The persona module 149*b* may manage personal information of the user utilizing the user terminal 100. For example, the persona module 149*b* may collect the usage information and the execution result of the user terminal 100 to manage personal information of the user.

The suggestion module 149*c* may predict the intent of the user to recommend a command to the user. For example, the suggestion module 149*c* may recommend a command to the user in consideration of the current state (e.g., a time, a place, a situation, or an app) of the user.

Figure 1C:
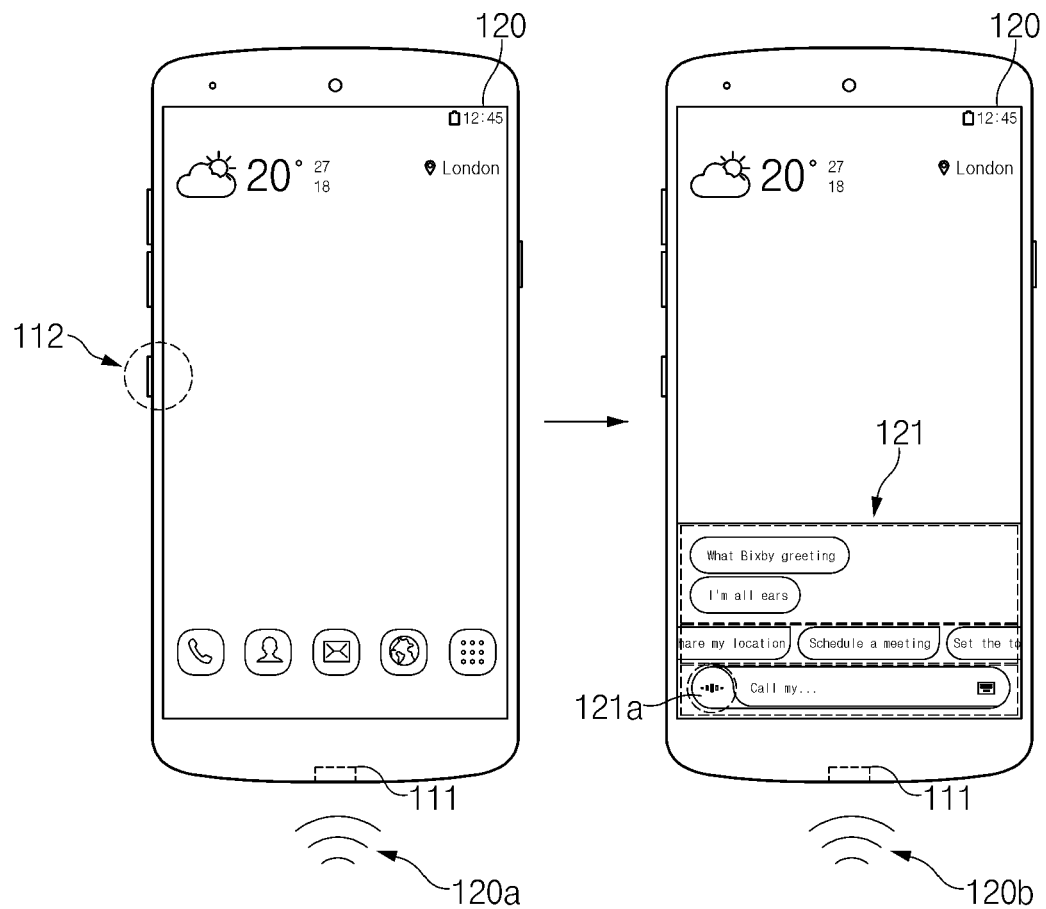
FIG. 1C is a diagram illustrating a form in which an intelligence app of a user terminal is executed, according to an embodiment.

FIG. 1C is a diagram illustrating a form in which an intelligence app of a user terminal is executed, according to an embodiment.

Referring to FIG. 1C, the user terminal 100 may include a hardware button 112 that functions as an interface for receiving an input according to a user utterance. For example, the hardware button 112 may be disposed in an accessible region of the user's body (e.g., a finger) on the housing of the user terminal 100; at least part of the hardware button 112 may be exposed to the outside of the housing. In an embodiment, the user terminal 100 may execute an intelligence app (e.g., a speech recognition app) operating in conjunction with the intelligence agent 145 of FIG. 1B, in response to the user manipulation applied to the hardware button 112. In an embodiment, a user may continuously press the hardware key 112 (e.g., press, press and hold, or the like) to enter (120*a*) a voice and then may enter (120*a*) the voice.

Alternatively, when receiving a user input through the hardware key 112, the user terminal 100 may display a UI 121 of the intelligence app on the display 120; the user may touch a speech recognition button 121*a* included in the UI 121 to enter (120*b*) a voice in a state where the UI 121 is displayed on the display 120.

Alternatively, the user terminal 100 may execute the installed intelligence app through a microphone 111. For example, when receiving a specified voice (e.g., wake up!, or the like) through the microphone 111, the user terminal 100 may example the intelligence app and may display the UI 121 of the intelligence app on the display 120.

Figure 1D:
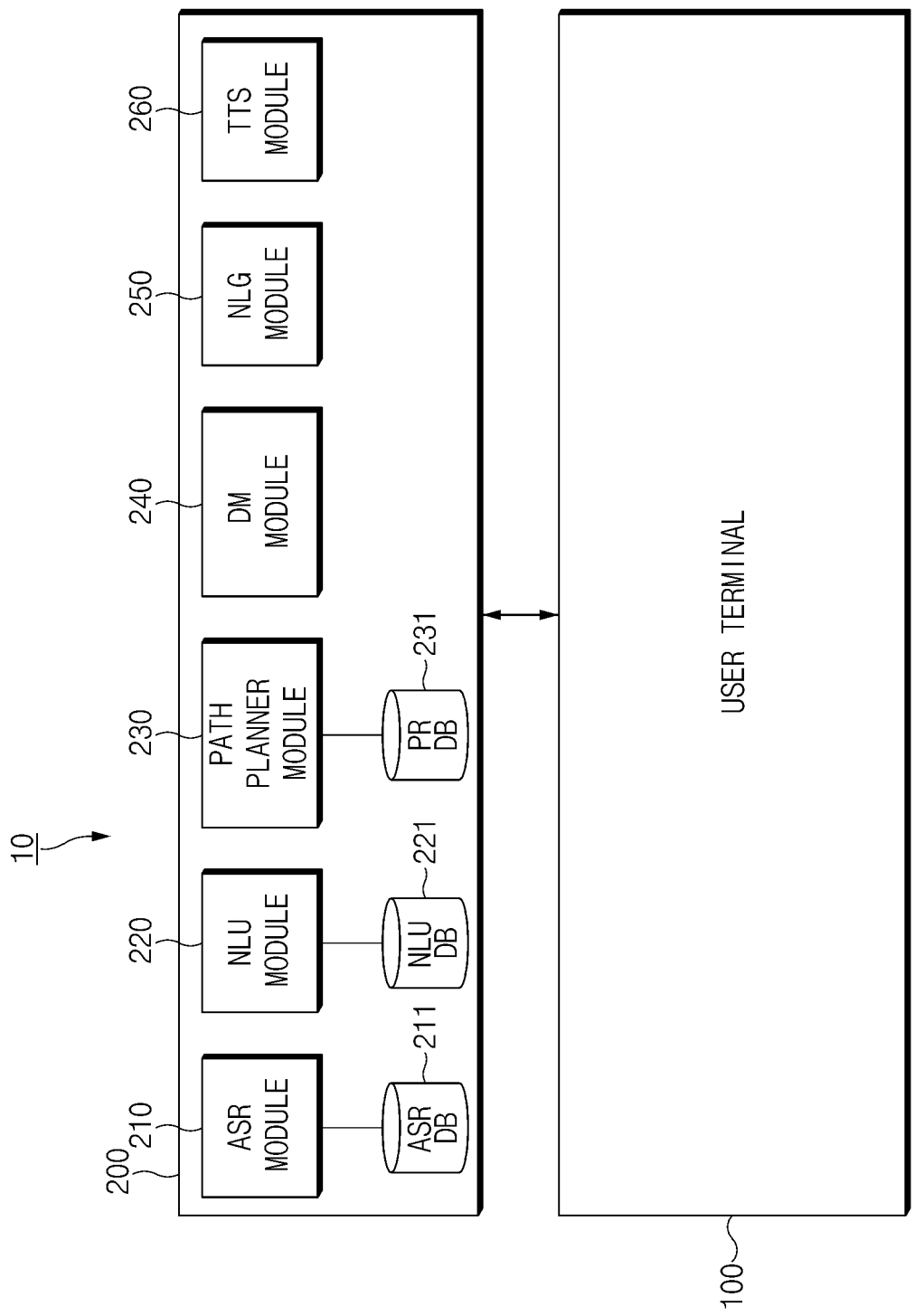
FIG. 1D is a diagram illustrating an intelligence server of an integrated intelligence system, according to an embodiment.

FIG. 1D is a diagram illustrating an intelligence server of an integrated intelligence system, according to an embodiment.

Referring to FIG. 1D, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. In various embodiments, at least part of the above-described components of the intelligence server 200 may be included in the user terminal 100 to perform a corresponding function operation.

According to an embodiment, the intelligence server 200 may include a communication circuit, a memory, or a processor. The processor may execute an instruction stored in the memory to operate the ASR module 210, the NLU module 220, the path planner module 230, the DM module 240, the NLG module 250, or the TTS module 260. The intelligence server 200 may transmit or receive data (or signal) to or from an external electronic device (e.g., the user terminal 100) through the communication circuit.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. Accordingly, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, to determine the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter to generate one path rule or a plurality of path rules. For example, the NLU module 220 may arrange the app to be executed and the action to be executed in the app by using information of the user terminal 100 depending on the intent of the user input in the form of ontology or a graph model to generate the path rule. For example, the generated path rule may be stored in a path rule database (PR DB) 231 through the path planner module 230. The generated path rule may be added to a path rule set of the DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may deliver a path rule set including the plurality of path rules to the NLU module 220. The plurality of path rules of the path rule set may be stored in the PR DB 231 connected to the path planner module 230 in the table form. For example, the path planner module 230 may deliver a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to deliver the selected one path rule or the selected plurality of path rules to the NLU module 220. For example, the path planner module 230 may match the user intent and the parameter to the path rule set corresponding to the user terminal 100 to select one path rule or a plurality of path rules and may deliver the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter to generate the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. When the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. The information changed to the text form may be in the form of a natural language speech. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information in the text form to information of a voice form. The TTS module 260 may receive the information of the text form from the NLG module 250, may change the information of the text form to the information of a voice form, and may transmit the information of the voice form to the user terminal 100. The user terminal 100 may output the information in the voice form to the speaker 130

According to an embodiment, the NLU module 220, the path planner module 230, and the DM module 240 may be implemented with one module. For example, the NLU module 220, the path planner module 230, and the DM module 240 may be implemented with one module, may determine the user intent and the parameter, and may generate a response (e.g., a path rule) corresponding to the determined user intent and parameter. As such, the generated response may be transmitted to the user terminal 100.

Figure 1E:
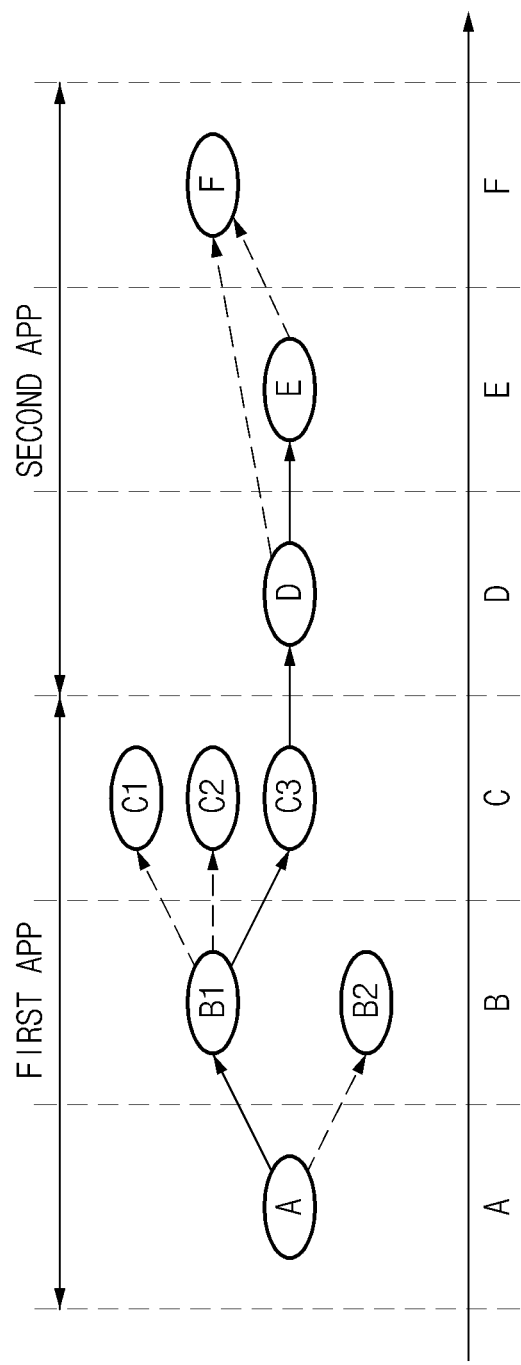
FIG. 1E is a diagram illustrating a path rule generating form of an intelligence server, according to an embodiment.

FIG. 1E is a diagram illustrating a path rule generating form of an intelligence server, according to an embodiment.

Referring to FIG. 1E, according to an embodiment, the NLU module 220 may divide the function of an app into any one action (e.g., state A to state F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules, each of which includes a plurality of actions (e.g., a sequence of states). The action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may deliver a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may deliver the one or more path rules to the user terminal 100.

According to an embodiment, the NLU module 220 may select one of a plurality of path rules based on an input added by the user terminal 100 and may deliver the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 to transmit the selected one path rule to the user terminal 100.

According to another embodiment, the NLU module 220 may determine the intent of a user and the parameter corresponding to the user input (e.g., an input for selecting C3) additionally entered by the user terminal 100 to transmit the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may deliver the partly corresponding path rule to the execution manager module 147. The processor 150 may execute the first app 141 depending on the path rule through the execution manager module 147. The processor 150 may transmit information about an insufficient parameter to the intelligence agent 145 through the execution manager module 147 while executing the first app 141. The processor 150 may make a request for an additional input to a user, using the information about the insufficient parameter, through the intelligence agent 145. When the additional input is received by the user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145 to execute the second app 143.

According to an embodiment, when a user input, in which a part of information is missing, is received by the intelligence server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is partly missing, by using the user information. As such, even though the user input in which a portion of information is missing is received by the intelligence server 200, the NLU module 220 may make a request for the missing information to receive an additional input or may determine a path rule corresponding to the user input by using user information.

According to an embodiment, Table 1 attached below may indicate an exemplary form of a path rule associated with a task that a user requests.

TABLE 1

| Path ruld ID | State | Parameter |
| --- | --- | --- |
| Gallery_101 | PictureView(25) | NULL |
| | SearchView(26) | NULL |
| | SearchViewResult(27) | Location, time |
| | SearchEmptySelectedView(28) | NULL |
| | SearchSelectedView(29) | CententType, selectall |
| | CrossShare(30) | Anaphora |

Referring to Table 1, a path rule that is generated or selected by an intelligence server (the intelligence server 200 of FIG. 1D) depending on a user utterance (e.g., "please share a picture") may include at least one state 25, 26, 27, 28, 29 or 30. For example, the at least one state (e.g., one operating state of the user terminal 100) may correspond to at least one of picture application execution PicturesView 25, picture search function execution SearchView 26, search result display screen output SearchViewResult 27, search result display screen output, in which a picture is non-selected, SearchEmptySelectedView 28, search result display screen output, in which at least one picture is selected, SearchSelectedView 29, or share application selection screen output CrossShare 30. In an embodiment, parameter information of the path rule may correspond to at least one state. For example, at least one picture is included in the selected state of SearchSelectedView 29. The task (e.g., "share a picture!") that the user requests may be performed depending on the execution result of the path rule including the sequence of the states 25, 26, 27, 28, and 29.

Figure 2A:
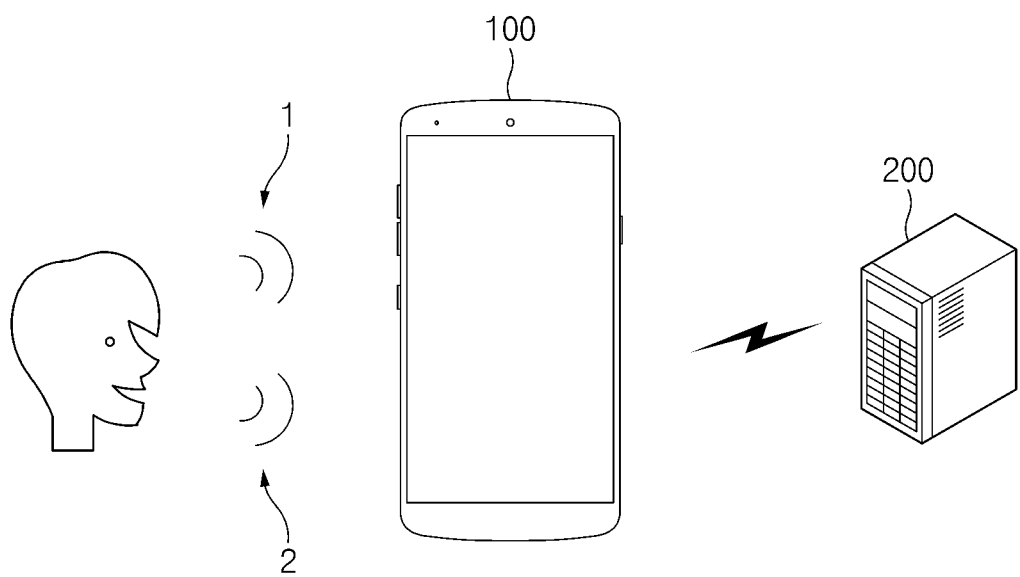
FIG. 2A is a view illustrating an environment for operating a speech recognition service of a user terminal, according to an embodiment.
Figure 2B:
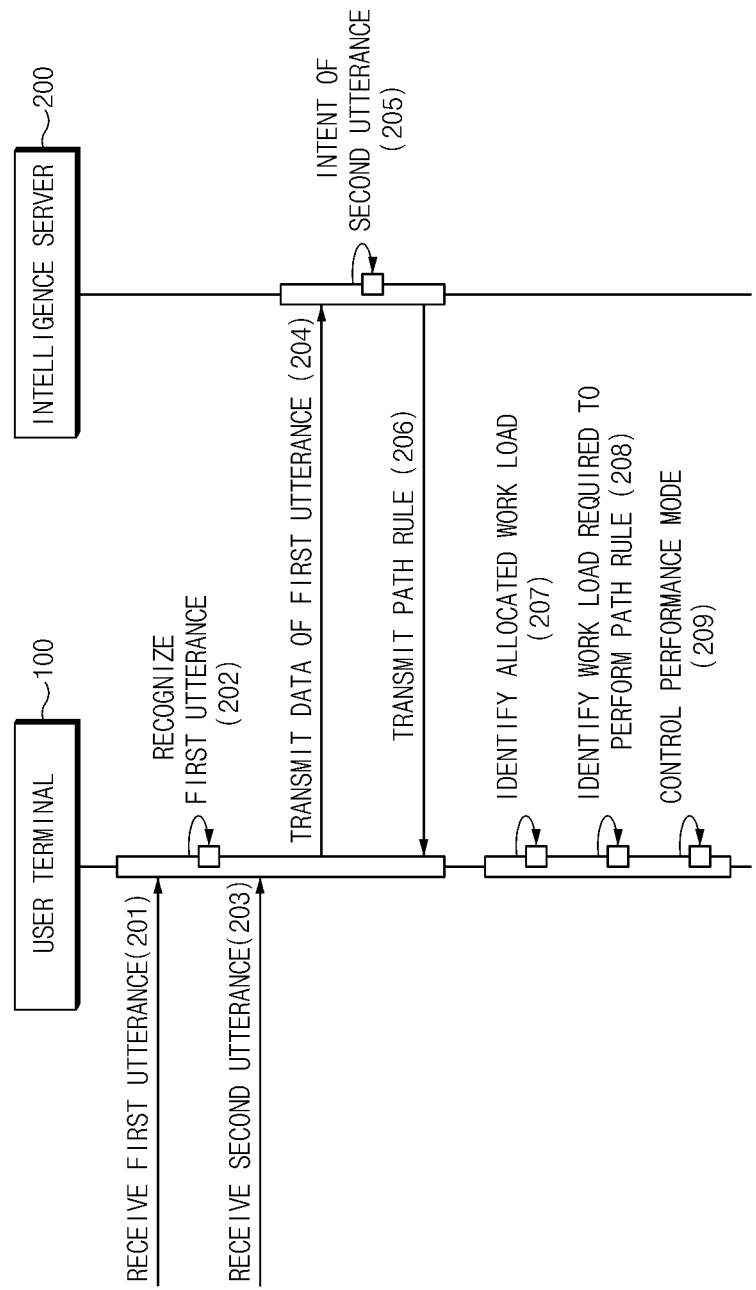
FIG. 2B is a diagram illustrating a signal flow between a user terminal and an intelligence server associated with the control of a performance mode of a user terminal according to an embodiment.
Figure 2C:
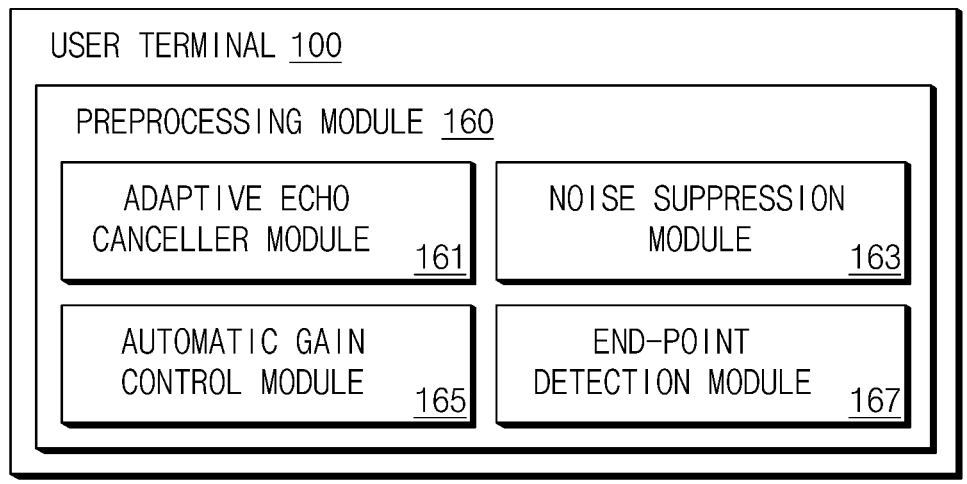
FIG. 2C is a diagram illustrating a preprocessing module of a user terminal according to an embodiment.

FIG. 2A is a view illustrating an environment for operating a speech recognition service of a user terminal, according to an embodiment. FIG. 2B is a diagram illustrating a signal flow between a user terminal and an intelligence server associated with the control of a performance mode of a user terminal according to an embodiment. FIG. 2C is a diagram illustrating a preprocessing module of a user terminal according to an embodiment.

Referring to FIGS. 2A and 2B, in operation 201, the user terminal 100 may receive a first utterance 1 from a user through the mounted microphone 111 of FIG. 1C. In an embodiment, the first utterance 1 may include a wake-up command utterance for changing the state of the user terminal 100. For example, the changing of the state may refer to the transition (or the activation of a speech recognition service function) from a listening state for waiting for receiving a user utterance to a wake-up state capable of recognizing or processing voice data entered depending on the occurrence of the user utterance.

In operation 202, the processor 150 of FIG. 1B of the user terminal 100 may recognize the first utterance 1 based on the wake-up recognition module described above and may determine whether at least one specified wake-up keyword (e.g., "Bixby" or "wake-up") is included with regard to the transition to the wake-up state on the first utterance 1. When it is determined that the first utterance 1 includes the wake-up keyword, the processor 150 may control the execution of the intelligence agent 145 of FIG. 1B and an intelligence app (e.g., a speech recognition app) operating in conjunction with the intelligence agent 145. Alternatively, in various embodiments, the processor 150 of the user terminal 100 may exclude above-described operation 201 and operation 202 and may transition to the wake-up state (or the activation state of the speech recognition service) in response to the user input applied to the hardware button 112 of FIG. 1C.

In operation 203, after the transition to the wake-up state, the user terminal 100 may receive a second utterance 2 associated with the execution of a specific task of the user terminal 100 through the microphone 111. For example, the second utterance 2 may include a task command utterance (e.g., "send a photo captured in Hawaii to Mom through a message", or the like) including a command or intent associated with the task (e.g., sending a photo through a message, or the like).

In operation 204, the processor 150 of the user terminal 100 may transmit voice data according to the second utterance 2 to the intelligence server 200 in connection with the processing of the received second utterance 2. In this operation, to support highly reliable speech recognition of the intelligence server 200 for the voice data, the processor 150 may transmit voice data according to the second utterance 2 after preprocessing. According to various embodiments, operation 201 and operation 203 described above may be performed as a single operation, and correspondingly, operation 202 and operation 204 may be performed as a single operation. For example, the user terminal 100 is a user utterances (e.g., "Bixby, send a photo captured in Hawaii to Mom through a message", or the like), which is continuous from the first utterance 1 to the second utterance 2, through the microphone 111 and may transmit voice data of the second utterance 2 continuous after the first utterance 1, to the intelligence server 200 while recognizing the first utterance 1 on the received user utterance.

Referring to FIG. 2C in connection with the preprocessing of voice data according to the second utterance 2, the user terminal 100 may include a preprocessing module 160 configured to include at least one of an adaptive echo canceller module 161, a noise suppression module 163, an automatic gain control module 165, or an end-point detection module 167.

The adaptive echo canceller module 161 may remove the echo included in the voice data according to the second utterance 2. The noise suppression module 163 may filter the voice data of the second utterance 2 to suppress background noise. The automatic gain control module 165 may perform volume adjustment through the application of a gain value or equalization of changing frequency features on the second utterance 2 (or the voice data of the second utterance 2). The end-point detection module 167 may determine the voice data section of the second utterance 2 and then may detect the end point of the second utterance 2 based on the determined voice data section. In this regard, the end-point detection module 167 may perform framing at a specified interval or period on the voice data of the second utterance 2 entered into the user terminal 100 and may extract voice information from each voice data corresponding to at least one frame. The end-point detection module 167 may compare the extracted voice information with a specified threshold value and may determine that a set of at least one frame including voice information of the threshold value or more is a voice data section. The end-point detection module 167 may determine that the final frame on the determined voice data section is the end point of the second utterance 2.

In operation 205, the intelligence server 200 may derive the intent of the second utterance 2 (e.g., a task command utterance) causing the voice data, in response to receiving the voice data from the user terminal 100. For example, the ASR module 210 in FIG. 1D of the intelligence server 200 may recognize voice data according to the second utterance 2 to convert the voice data into text data; the NLU module 220 of FIG. 1D may derive the intent of the second utterance 2 by analyzing the text data based on a matching rule composed of domains, intents, and parameters.

In operation 206, the NLU module 220 may determine an application program for performing a task in the user terminal 100 based on the derived intent of the second utterance 2 and may generate or select a path rule for states (or actions) of the user terminal 100 accompanying the execution of the task to transmit the path rule to the user terminal 100.

In operation 207, at the time of receiving the path rule from the intelligence server 200, the processor 150 of the user terminal 100 may identify the work load (hereinafter referred to as a "first work load") allocated to the user terminal 100. For example, the first work load may mean a workload for computing resources associated with the functional operation being performed by the user terminal 100, the execution (e.g., the execution of an intelligence app, or the like) of an application program accompanying the functional operation, or the like. In this case, the processor 150 may be in a state of operating at an operating frequency corresponding to (or capable of processing the first work load) the first work load.

In operation 208, the processor 150 may identify the path rule received from the intelligence server 200 to identify the work load (hereinafter referred to as a "second work load") required to execute the path rule (or task execution according to the path rule). For example, the processor 150 may identify an application program (e.g., a message application program) to be executed in connection with the execution of the path rule and may identify the second work load required upon executing the identified application program or operating a function. In this regard, for example, the work load value (or size) required upon executing at least one application program (e.g., preloaded or third party application programs, or the like) installed in the user terminal 100 and operating a function may be stored in the memory 140 in FIG. 1B of the user terminal 100 in the form of a table or a database. Alternatively, in the operation in which the user terminal 100 determines an application program for performing a task, the intelligence server 200 may provide the user terminal 100 with work load information associated with the determined application program; the processor 150 of the user terminal 100 may identify the second work load required to execute the path rule based on the work load information.

In operation 209, the processor 150 may control the performance mode set for the user terminal 100 by comparing the identified first work load with the second work load. For example, the performance mode may be associated with the communication of the processor 150 or the processing speed or throughput of data. For example, the controlling of the performance mode may mean that the performance of the user terminal 100 is set to the low or high performance by controlling the clock frequency of the processor 150 to adjust the operating speed of the processor 150. In an embodiment, the processor 150 may determine that the second work load is not capable of being processed at the current operating frequency corresponding to the first work load (or determine that the first work load is smaller than the second work load), based on the comparison result of the first work load and second work load. In this case, the processor 150 may set the performance mode of the user terminal 100 to high performance by increasing the current operating frequency to a specified magnitude or gradually increasing the current operating frequency by the specified magnitude. Alternatively, when it is determined that the second work load is capable of being processed at the current operating frequency corresponding to the first work load (or when it is determined that the first work load is greater than the second work load), the processor 150 may maintain the current operating frequency and the performance mode set for the user terminal 100. In an embodiment, after setting the performance mode of the user terminal 100, the processor 150 may perform the path rule received from the intelligence server 200; when the task corresponding to the second utterance 2 is completed depending on the execution of the path rule, the processor 150 may restore the controlled operating frequency and performance mode to the state before the control.

Figure 3:
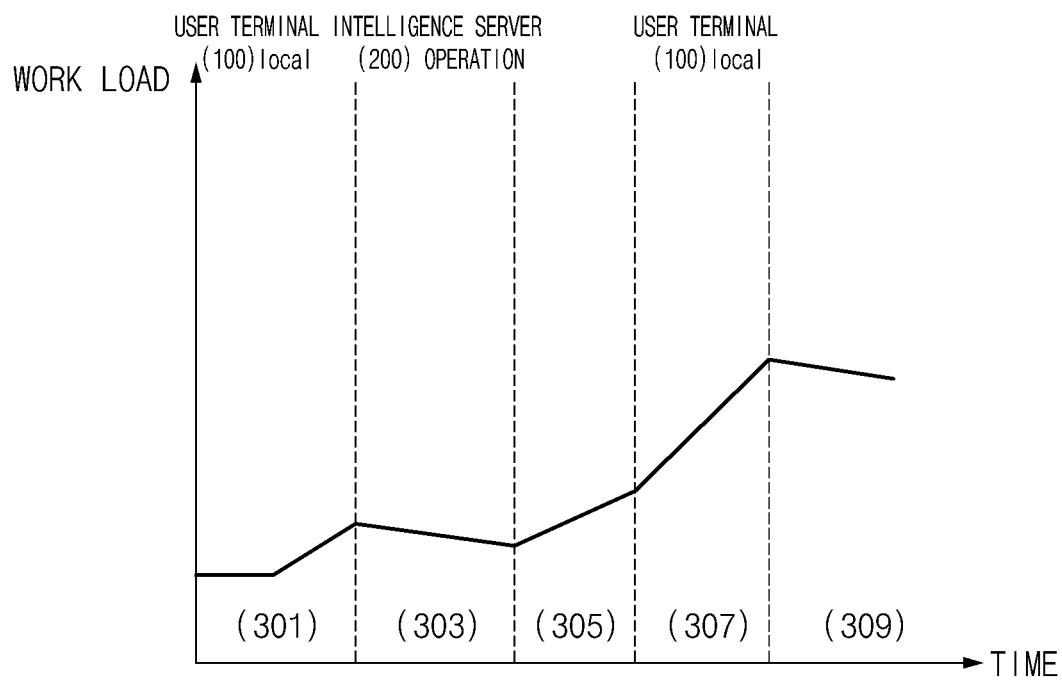
FIG. 3 is a view illustrating a progress of a work load of a user terminal according to an embodiment.
Figure 4:
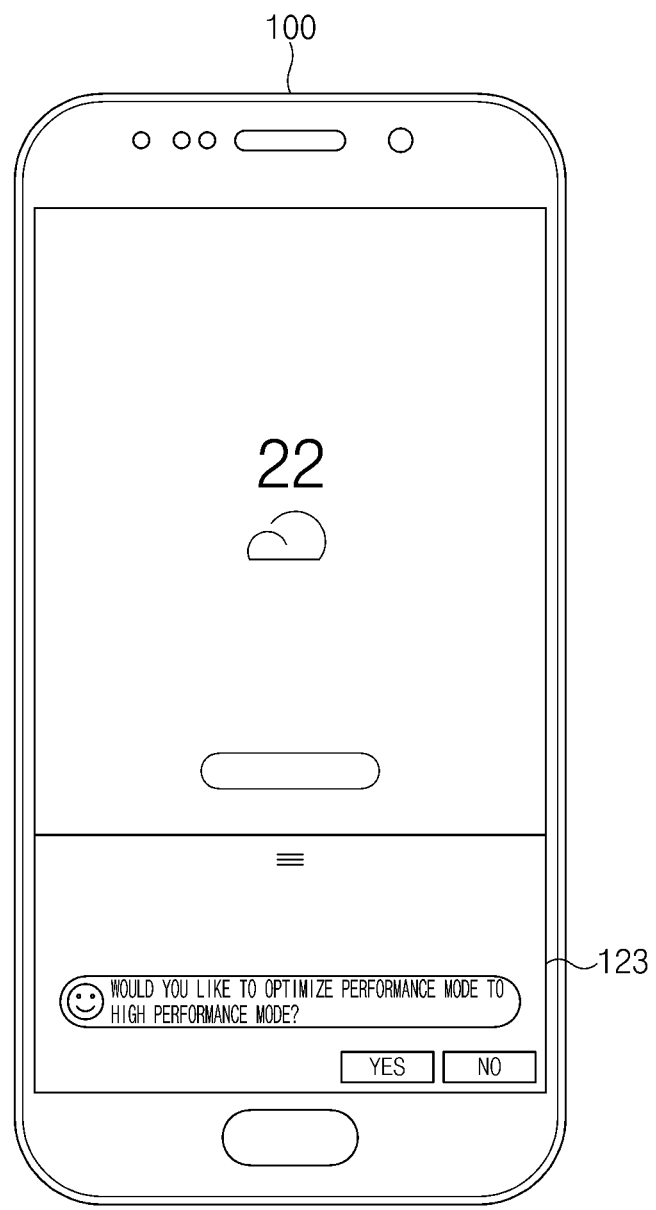
FIG. 4 is a view illustrating a user interface associated with performance mode settings of a user terminal according to an embodiment.

FIG. 3 is a view illustrating a progress of a work load of a user terminal according to an embodiment. FIG. 4 is a view illustrating a user interface associated with performance mode settings of a user terminal according to an embodiment.

Referring to FIG. 3, at a first time 301, the user terminal 100 may receive the first utterance 1 in FIG. 2 (e.g., a wake-up command utterance) from a user. In this operation, the user terminal 100 may control the execution of the intelligence agent 145 in FIG. 1B and an intelligence app depending on the processing of the first utterance 1; in this case, as the load of the library accompanying the execution of the intelligence agent 145 and the intelligence app or the internal resource structure is initialized, the work load of the user terminal 100 may increase by a predetermined amount. Furthermore, after receiving the first utterance 1, as the user terminal 100 receives and processes the second utterance 2 in FIG. 2 (e.g., a task command utterance) (e.g., preprocessing and transmitting voice data to the intelligence server 200), the work load of the user terminal 100 may increase by a predetermined amount.

At a second time 303, the user terminal 100 may wait for receiving response information (e.g., a path rule) associated with the processing of the second utterance 2 from the intelligence server 200. At this time, as the user terminal 100 does not perform a separate function other than the communication function, the work load may be reduced by a predetermined amount.

At a third time 305, the user terminal 100 may receive response information (e.g., a path rule) from the intelligence server 200 to identify an application program associated with task execution and may control the execution of the identified application program. In this operation, in a context similar to the execution of the intelligence agent 145 and the intelligence app, as the load of the library associated with the execution of the identified application program or the internal resource structure is initialized, the work load of the user terminal 100 may increase by a predetermined amount.

At a fourth time 307, the user terminal 100 may execute a path rule based on an application program associated with the execution of the task. In this operation, to improve the speed of the response (e.g., the execution of a task according to a path rule) to the second utterance 2, the user terminal 100 may perform various control, communication operations, data processing, or the like associated with the functional operation of the application program at high speed or large capacity. Accordingly, the work load of the user terminal 100 may relatively rapidly increase at another time (e.g., the first time 301, the second time 303, or the third time 305) described above. According to an embodiment, the amount of change in work load at the fourth time 307 may differ depending on the task to be performed. In this regard, when the first task (e.g., sending a photo through a message) is performed at the fourth time 307, the path rule according to the first task may be performed in a series of sequences such as a gallery app execution action, a photo search and selection action, a message app execution action, a message recipient search action, a message interface entry action, a photo attachment action, and a message transmission action. When the second task (e.g., sending a message) simpler than the first task is performed at the fourth time 307, a path rule including a sequence such as the message app execution action, the message recipient search action, the message interface entry action, the message transmission action, and the like may be performed. As such, a sequence of path rules, related parameters (e.g., information necessary to perform an action), or the state (e.g., an action execution state) of a user terminal may differ depending on the task performed at the fourth time 307. In other words, at the fourth time 307, the value (or magnitude) of a work load required to perform the path rule may differ depending on a path rule associated with the execution of a task.

At the fifth time 309, the user terminal 100 may output the result according to the execution of the task (or the execution of the path rule corresponding to the task). For example, the user terminal 100 may output a user interface (e.g., a screen for executing a path rule) indicating the state of the user terminal 100 according to the execution of the task, content associated with the task, or the like. Alternatively, the user terminal 100 may output information for guiding the completion of the task execution in the form of a text or voice. In this operation, the work load of the user terminal 100 required to output the result may differ depending on the output method of the result. For example, when the result is output in the auditory manner (e.g., a voice), the display 120 in FIG. 1B of the user terminal 100 may be controlled in a low power state (e.g., a black screen); at this time, the work load may be relatively small when the result is visually displayed (e.g., a user interface, or the like). After outputting the result, the user terminal 100 may wait for another command or input of a user, and the work load in the standby state may be reduced gradually.

According to an embodiment, at the third time 305, the processor 150 in FIG. 1B of the user terminal 100 may identify the work load (hereinafter referred to as the first work load) allocated to the user terminal 100 and the work load (hereinafter referred to as the second work load) based on the response information (e.g., a path rule) received from the intelligence server 200. The processor 150 may compare the first work load with the second work load and may perform the performance mode settings of the user terminal 100 according to the above-described operating frequency control, depending on the comparison result.

According to various embodiments, at the first time 301, the processor 150 may set the operating frequency of the user terminal 100 to a high performance mode by increasing the operating frequency to the specified magnitude or gradually increasing the operating frequency by the specified magnitude. This may be understood as an operation considering response information (e.g., a path rule) to be received later or the task to be performed, based on the execution of the intelligence agent 145 and an intelligence app.

Referring to FIG. 4, the processor 150 of the user terminal 100 may perform the performance mode settings of the user terminal 100 performed at the third time 305, based on the permission of a user. For example, when it is determined that the second work load is not capable of being processed at the current operating frequency (or a current performance mode) corresponding to the first work load (or when it is determined that the processing speed is slow or the throughput is small), the processor 150 may control the display 120 to output a user interface 123 associated with the performance mode settings. The processor 150 may determine the user's permission for changing the performance mode of the user terminal 100 based on the user input applied to the user interface 123 and may perform the performance mode change or may maintain the set performance mode.

According to various embodiments, the user interface 123 may be output at the time (e.g., the first time 301 in FIG. 3) of receiving the first utterance 1 (e.g., a wake-up command utterance) in FIG. 2 from the user. In the operation of a speech recognition service through the user terminal 100, this may be understood as an operation of inquiring the user's intent as to whether to change the performance mode of the user terminal 100.

According to various embodiments described above, an electronic device may include a communication module for communicating with at least one external device, a microphone for receiving a user utterance, a memory for storing information about a performance mode set for the electronic device, and a processor electrically connected to the communication module, the microphone, and the memory.

According to various embodiments, the processor may be configured to receive a first user utterance associated with execution of a task through the microphone, to transmit first data associated with the first user utterance to an external device, to receive second data associated with processing at least part of the first data from the external device, to identify a first work load allocated to the electronic device at a time of receiving the second data, and to compare a second work load required to process the second data with the first work load to control the performance mode.

According to various embodiments, the processor may be configured to determine an application program associated with the execution of the task based on the second data.

According to various embodiments, the processor may be configured to determine a required work load as the second work load when executing the task through executing the determined application program.

According to various embodiments, the processor may be configured to store a work load, which is required upon executing at least one application program included in the electronic device or upon operating a function, in a database of the memory.

According to various embodiments, the processor may be configured to operate at a first operating frequency corresponding to the first work load, at a time before reception of the second data.

According to various embodiments, the processor may be configured to change the first operating frequency to a second operating frequency greater than the first operating frequency when it is determined, based on a result of comparing the first work load and the second work load, that the second work load is not capable of being processed at the first operating frequency corresponding to the first work load.

According to various embodiments, the processor may be configured to control the performance mode of the electronic device to be a specified high performance mode as a change to the second operating frequency.

According to various embodiments, the processor may be configured to maintain the first operating frequency when it is determined, based on a result of comparing the first work load and the second work load, that the second work load is capable of being processed at the first operating frequency corresponding to the first work load.

According to various embodiments, the processor may be configured to output a user interface associated with controlling of the performance mode of the electronic device, at a time of reception of the second data.

According to various embodiments, the electronic device may further include a hardware button.

According to various embodiments, the processor may be configured to activate a speech recognition service in response to a user input applied to the hardware button or a second user utterance received through the microphone, at a time before reception of the first user utterance.

Figure 5:
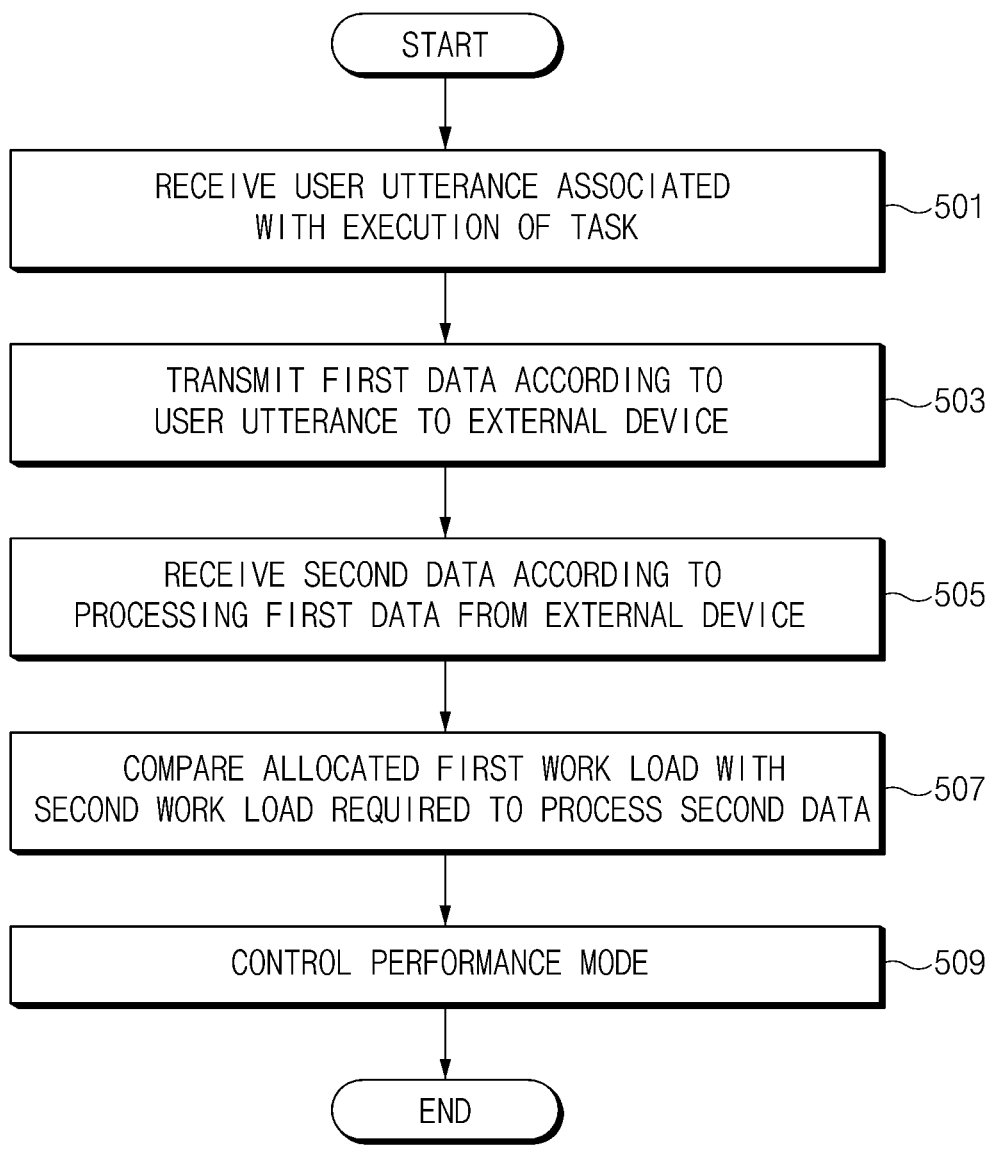
FIG. 5 is a diagram illustrating a method for controlling a performance mode of a user terminal according to an embodiment.

FIG. 5 is a diagram illustrating a method for controlling a performance mode of a user terminal according to an embodiment. The operations described through FIG. 5 may be at least partially the same or similar to those described in FIG. 2B and redundant descriptions may be omitted.

Referring to FIG. 5, in operation 501, the processor 150 in FIG. 1B of the user terminal 100 in FIG. 1B may receive a user utterance entered through a microphone 111 in FIG. 1C. For example, the user utterance may include a task command utterance including a command or intent for performing a specific task through the user terminal 100. According to an embodiment, the user terminal 100 in operation 501 may be understood as being in a wake-up state capable of recognizing or processing voice data according to the user utterance (or a state where a speech recognition service function is activated depending on the execution of the intelligence agent 145 in FIG. 1B and the intelligence app).

In operation 503, the processor 150 may transmit first data (e.g., voice data) associated with the user utterance to an external device (e.g., the intelligence server 200 of FIG. 1D) supporting the speech recognition service. In this operation, to support highly reliable speech recognition of the external device for the first data, the processor 150 may preprocess (e.g., echo cancellation, noise removal, volume adjustment, frequency change, end-point detection, or the like) to transmit the first data.

In operation 505, the processor 150 may receive second data including a path rule for states (or actions) of the user terminal 100 accompanying the task execution, from an external device. In this regard, the external device may derive the intent of a user utterance based on the first data and may generate or select a path rule corresponding to the derived intent of the user utterance to transmit the path rule to the user terminal 100.

In operation 507, after receiving the second data, the processor 150 may identify the first work load (e.g., the amount of work for computing resources associated with the functional operation being performed by the user terminal 100 or the application program being executed) allocated to the user terminal 100. Moreover, the processor 150 may identify the second work load (e.g., the amount of work for computing resources associated with the functional operation for performing a path rule or the execution of an application program), which is required to process the second data, to compare the second work load with the first work load.

In operation 509, the processor 150 may control the performance of the user terminal 100 to be in a low performance mode or a high performance mode, depending on the comparison result. For example, when it is determined that the first work load is smaller than the second work load (or when it is determined that the processing speed is slow or the throughput is small upon processing the second work load at the current operating frequency corresponding to the first work load), the processor 150 may control the user terminal 100 to be in a high performance mode by increasing the operating frequency (e.g., a clock frequency) to a specified magnitude or gradually increasing the operating frequency by the specified magnitude. Alternatively, when it is determined that the first work load is greater than the second work load (or when it is determined that the second work load is capable of being processed at the current operating frequency corresponding to the first work load), the processor 150 may maintain the current operating frequency and/or the performance mode of the user terminal 100.

According to various embodiments described above, a method of controlling a performance mode of an electronic device may include receiving a first user utterance associated with execution of a task, through a microphone mounted in the electronic device, transmitting first data associated with the first user utterance to an external device, receiving second data associated with processing at least part of the first data from the external device, identifying a first work load allocated to the electronic device at a time of receiving the second data, and comparing a second work load required to process the second data with the first work load to control the performance mode of the electronic device.

According to various embodiments, the receiving of the second data may include determining an application program associated with the execution of the task based on the second data.

According to various embodiments, the determining of the application program may include determining a required work load as the second work load when executing the task through executing the determined application program.

According to various embodiments, the method of controlling a performance mode may further include storing a work load, which is required upon executing at least one application program included in the electronic device or upon operating a function, in a database.

According to various embodiments, the method of controlling a performance mode may further include operating, by a processor of the electronic device, at a first operating frequency corresponding to the first work load, at a time before reception of the second data.

According to various embodiments, the controlling of the performance mode of the electronic device may include changing the first operating frequency to a second operating frequency greater than the first operating frequency when it is determined, based on a result of comparing the first work load and the second work load, that the second work load is not capable of being processed at the first operating frequency corresponding to the first work load.

According to various embodiments, the changing of the first operating frequency to the second operating frequency may include controlling the performance mode of the electronic device to be a specified high performance mode.

According to various embodiments, the controlling of the performance mode of the electronic device may include maintaining the first operating frequency when it is determined, based on a result of comparing the first work load and the second work load, that the second work load is capable of being processed at the first operating frequency corresponding to the first work load.

According to various embodiments, the method of controlling a performance mode may further include outputting a user interface associated with controlling of the performance mode of the electronic device, at a time of reception of the second data.

According to various embodiments, the method of controlling a performance mode may further include activating a speech recognition service in response to a user input applied to a specified hardware button included in the electronic device or a second user utterance received through the microphone, at a time before reception of the first user utterance.

Figure 6:
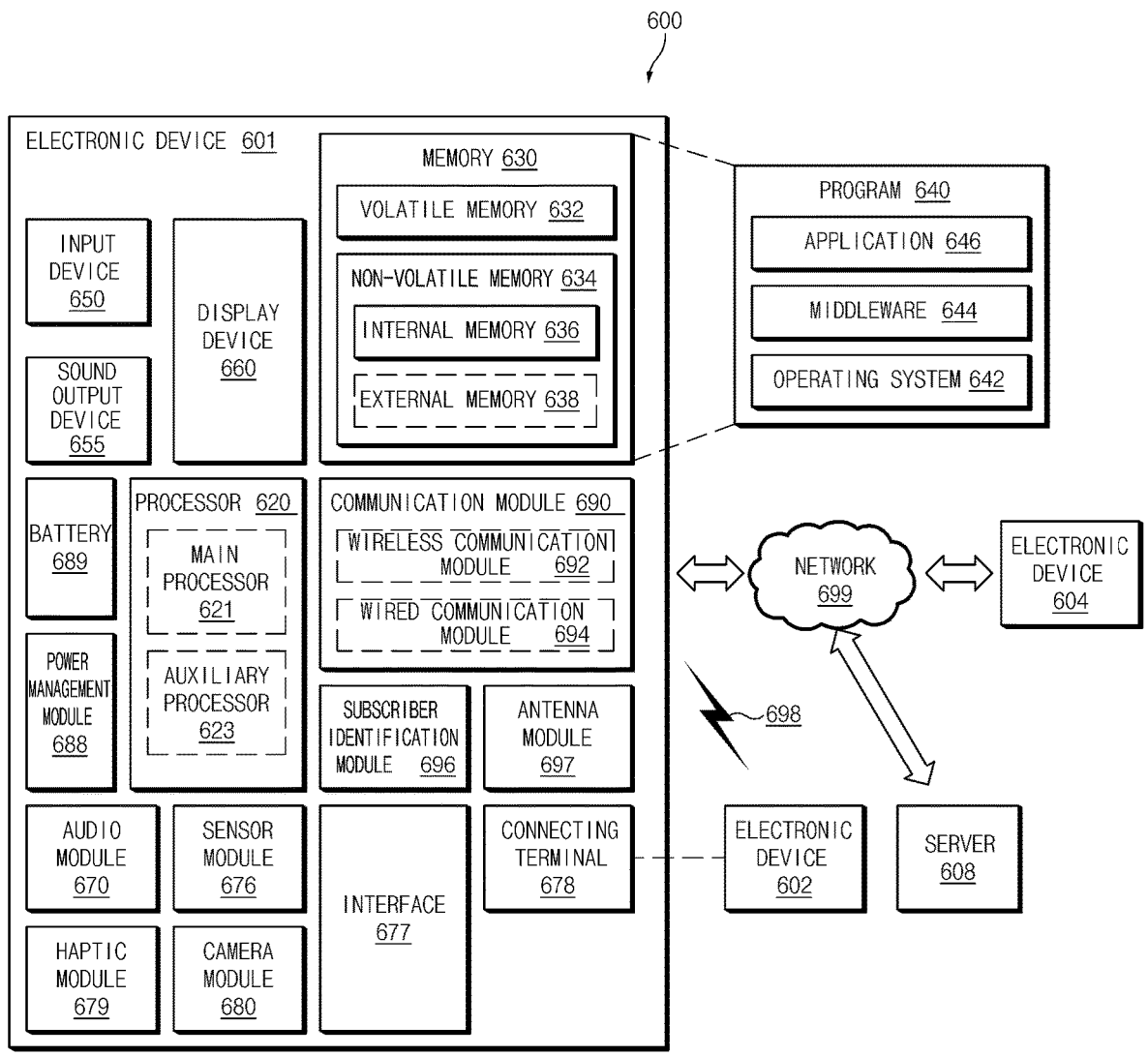
FIG. 6 is a diagram illustrating a user terminal in a network environment, according to an embodiment.

FIG. 6 is a diagram illustrating an electronic device in a network environment, according to an embodiment.

Referring to FIG. 1, an electronic device 601 (e.g., the user terminal 100 of FIG. 1B) in a network environment 600 may communicate with an electronic device 602 over a first network 698 (e.g., a short-range wireless communication) or may communicate with an electronic device 604 or a server 608 (e.g., the intelligence server 200 of FIG. 1D) over a second network 699 (e.g., a long-range wireless communication). According to an embodiment, the electronic device 601 may communicate with the electronic device 604 through the server 608. According to an embodiment, the electronic device 601 may include a processor 620 (e.g., the processor 150 of FIG. 1B), a memory 630 (e.g., the memory 140 of FIG. 1B), an input device 650 (e.g., the input module 110 of FIG. 1B), a sound output device 655 (e.g., the speaker 130 of FIG. 1B), a display device 660 (e.g., the display 120 of FIG. 1B), an audio module 670, a sensor module 676, an interface 677, a haptic module 679, a camera module 680, a power management module 688, a battery 689, a communication module 690, a subscriber identification module 696, and an antenna module 697. In any embodiment, the electronic device 601 may not include at least one (e.g., the display device 660 or the camera module 680) of the above-described components or may further include another component. In any embodiment, for example, as in the sensor module 676 (e.g., a fingerprint sensor, an iris sensor, or an illuminance sensor) embedded in the display device 660 (e.g., a display), some of components may be implemented integrally.

For example, the processor 620 may execute software (e.g., a program 640) to control at least another component (e.g., hardware or software component) of the electronic device 601 connected to the processor 620, and may process and calculate various types of data. The processor 620 may load commands or data received from other components (e.g., the sensor module 676 or the communication module 690) into the volatile memory 632, may process the commands or the data, and may store the result data in the nonvolatile memory 634. According to an embodiment, the processor 620 may include a main processor 621 (e.g., a central processing unit or an application processor) and an auxiliary processor 623 (e.g., a graphic processing unit, an image signal processor, a sensor hub processor, or a communication processor), which is capable of operating independently and which, additionally or alternatively, use lower power than the main processor 621 or is specialized to a specified function. Herein, the auxiliary processor 623 may be operated separately from the main processor 621 or embedded in the main processor 621.

In this case, the auxiliary processor 623 may control at least part of the functions or states associated with at least one (e.g., the display device 660, the sensor module 676, or the communication module 690) of the components of the electronic device 601, instead of the main processor 621 while the main processor 621 is in an inactive (e.g., sleep) state or together with the main processor 621 while the main processor 621 is in an active (e.g., the execution of an application) state. According to an embodiment, the auxiliary processor 623 (e.g., an image signal processor or a communication processor) may be implemented as some components of operatively associated other components (e.g., the camera module 680 or the communication module 690). The memory 630 may store various pieces of data, for example, software (e.g., the program 640) and input data or output data for commands associated with the software, which are used by at least one component (e.g., the processor 620 or the sensor module 676) of the electronic device 601. The memory 630 may include, for example, the volatile memory 632 or the nonvolatile memory 634.

The program 640 may be software stored in the memory 630 and may include, for example, an operating system 642, a middleware 644, or an application 646.

The input device 650 may be a device for receiving commands or data to be used for the component (e.g., the processor 620) of electronic device 601, from the outside (e.g., a user) of the electronic device 601, and may include, for example, a microphone, a mouse, or a keyboard.

The audio output device 655 may be a device for outputting an audio signal to the outside of the electronic device 601; for example, the audio output device 655 may include a speaker used for general purposes, such as multimedia playback or recording playback, and a receiver used only for receiving a call. According to an embodiment, the receiver may be implemented separately from the speaker or may be integrated with the speaker.

The display device 660 may be a device for visually providing information to a user of the electronic device 601 and may include, for example, a display, a hologram device, or a projector, and a control circuit for controlling a corresponding device. According to an embodiment, the display device 660 may include a touch circuitry or a pressure sensor for measuring an intensity of pressure on the touch.

The audio module 670 may convert a sound and an electric signal in dual directions. According to an embodiment, the audio module 670 may obtain sound through the input device 650, or may output sound through the sound output device 655, or through an external electronic device (e.g., the electronic device 602) (e.g., a speaker or a headphone) wiredly or wirelessly connected with the electronic device 601.

The sensor module 676 may generate an electrical signal or a data value corresponding to an internal operation state (e.g., power or a temperature) of the electronic device 601 or corresponding to an external environment state. For example, the sensor module 676 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 677 may support a specified protocol capable of being connected to an external electronic device (e.g., the electronic device 602) wiredly or wirelessly. According to an embodiment, the interface 677 may include a high definition multimedia interface (HDMI), a universal serial bus (USB) interface, a secure digital (SD) card interface, or an audio interface.

The connecting terminal 678 may include a connector capable of physically connecting the electronic device 601 to an external electronic device (e.g., the electronic device 602), for example, an HDMI connector, a USB connector, an SD card connector, or an audio connector. (e.g., a headphone connector).

The haptic module 679 may convert an electrical signal to a mechanical stimulation (e.g., vibration or movement) or an electrical stimulation which the user may perceive through the sense of touch or the sense of movement. The haptic module 679 may include, for example, a motor, a piezoelectric element, or an electric stimulator.

The camera module 680 may photograph a still image and a video. According to an embodiment, the camera module 680 may include one or more lenses, an image sensor, an image signal processor, or a flash.

The power management module 688, which is to manage the power supplied to the electronic device 601, may constitute at least part of a power management integrated circuit (PMIC).

The battery 689 that is a device for supplying power to at least one component of the electronic device 601 may include, for example, a primary cell incapable of being recharged, a secondary cell rechargeable, or a fuel cell.

The communication module 690 may establish a wired or wireless communication channel between the electronic device 601 and an external electronic device (e.g., the electronic device 602, the electronic device 604, or the server 608) and may perform communication through the established communication channel. The communication module 690 may include at least one communication processor operating independently from the processor 620 (e.g., an application processor) and supporting the wired communication or the wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication module). The communication module 190 may communicate with an external electronic device through a first network 698 (e.g., a short-range communication network such as Bluetooth, Wi-Fi direct or infrared data association (IrDA)) or a second network 699 (e.g., a long-range communication network such as a cellular network, Internet, or a computer network (e.g., LAN or WAN)), using the corresponding communication module among the wireless communication module 192 or the wired communication module 194. The above-mentioned various communication modules 690 may be implemented into one chip or into separate chips, respectively.

According to an embodiment, the wireless communication module 692 may distinguish and authenticate the electronic device 601 in the communication network, using user information stored in the subscriber identification module 696.

The antenna module 697 may include one or more antennas for transmitting or receiving a signal or power to or from the outside. According to an embodiment, the communication module 690 (e.g., the wireless communication module 692) may transmit a signal to an external electronic device through an antenna suitable for a communication method, or may receive a signal from the external electronic device.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received between the electronic device 601 and the external electronic device 604 through the server 608 connected to the second network 699. Each of the electronic devices 602 and 604 may be a device of which the type is different from or the same as that of the electronic device 601. According to an embodiment, all or part of operations that the electronic device 601 will perform may be executed by another external electronic device or a plurality of external electronic devices. According to an embodiment, when the electronic device 601 needs to execute any function or service automatically or in response to a request, the electronic device 601 may not perform the function or the service internally, but, alternatively or additionally, it may make a request for at least part of a function associated with the electronic device 101 to the external electronic device. The external electronic device receiving the request may execute the requested function or additional function and may deliver the execution result to the electronic device 601. The electronic device 601 may provide the requested function or service by processing the received result as it is, or additionally. To this end, for example, cloud computing, distributed computing, or client-server computing technologies may be used.

According to various embodiments disclosed in the disclosure, the electronic device may include various types of devices. For example, the electronic device may include at least one of a portable communication device (e.g., a smartphone), a computer device, a portable multimedia device, a mobile medical appliance, a camera, a wearable device, or a home appliance. An electronic device according to an embodiment of the disclosure may not be limited to the above-described electronic devices.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When a (e.g., first) component is referred to as being "(operatively or communicatively) coupled with/to" or "connected to" another (e.g., second) component, it may be directly coupled with/to or connected to the other component or an intervening component (e.g., a third component) may be present.

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. For example, the module may be implemented with an application-specific integrated circuit (ASIC).

Various embodiments of the disclosure may be implemented with software (e.g., the program 640) including instructions stored in machine-readable storage media (e.g., the internal memory 636 or the external memory 638) readable by a machine (e.g., a computer). The machine may be a device capable of calling the stored instructions from the storage media and capable of operating depending on the called instructions and may include an electronic device (e.g., the electronic device 601) according to the disclosed embodiments. The instructions, when executed by a processor (e.g., the processor 620), may cause the processor to perform a function corresponding to the instructions, directly or by using other components under the control of the processor. The instructions may include the code generated or executed by a compiler or an interpreter. The machine-readable storage medium may be provided in the form of a non-transitory storage medium. Herein, 'non-transitory' just means that the storage medium is a tangible device and does not include a signal, and 'non-transitory' does not distinguish between the case where data is semi-permanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed, in the form of a machine-readable storage medium (e.g., compact disc read only memory (CD-ROM)) or online through an application store (e.g., PlayStore™). In the case of on-line distribution, at least part of the computer program product may be at least temporarily stored in the storage medium such as the memory of a manufacturer's server, an application store's server, or a relay server or may be generated temporarily.

Each of components (e.g., a module or a program) according to various embodiments may include a single entity or a plurality of entities; some of the above-described corresponding sub components may be omitted, or any other sub component may be further included in various embodiments. Alternatively or additionally, some components (e.g., a module or a program) may be combined with each other so as to form one entity, so that the functions of the components may be performed in the same manner as before the combination. According to various embodiments, operations executed by modules, program modules, or other components may be executed by a successive method, a parallel method, a repeated method, or a heuristic method. Alternatively, at least some of the operations may be executed in another order or may be omitted, or any other operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a communication circuitry;
a microphone configured to receive a user utterance;
a memory configured to store at least one application program and a work load value which is required to perform a path rule, wherein the work load value differs depending on the path rule; and
a processor electrically connected to the communication circuitry, the microphone, and the memory,
wherein the processor is configured to:
receive a first user utterance associated with execution of a task through the microphone,
transmit first data associated with the first user utterance to an external device through the communication circuitry,
in response to transmitting the first data, receive a first path rule associated with the execution of the task corresponding to the first user utterance from the external device,
wherein the first path rule indicates an order of a plurality of actions to be executed by the at least one application program,
identify a first work load allocated to the electronic device at a time of receiving the first path rule,
determine, based on the first path rule, an application program associated with the execution of the task,
obtain, based on the stored work load value and the first path rule, a second work load corresponding to the order of the plurality of actions to be executed by the determined application program,
when the first work load is greater than the second work load, execute the task associated with the first user utterance based on the first path rule, in a first performance mode that an operating frequency of the processor is set to a first operating frequency corresponding to the first work load, and
when the first work load is smaller than the second work load, execute the task associated with the first user utterance based on the first path rule, in a second performance mode that the operating frequency of the processor is set to a second operating frequency greater than the first operating frequency.

2. The electronic device of claim 1, wherein the second operating frequency corresponds the second work load.

3. The electronic device of claim 1, wherein the processor is further configured to:
when the execution of the task is completed, control the electronic device to operate in the first performance mode.

4. The electronic device of claim 1, wherein the processor is further configured to:
control the electronic device to operate in the first performance mode, at a time before reception of the first path rule.

5. The electronic device of claim 1, wherein the processor is further configured to:

output a user interface associated with execution of the second performance mode, at a time before execution of the second performance mode.

6. The electronic device of claim 1, further comprising:
a hardware button,
wherein the processor is further configured to:
   activate a speech recognition service in response to a user input applied to the hardware button or a second user utterance received through the microphone, at a time before reception of the first user utterance.

7. A method of controlling a performance mode of an electronic device, the method comprising:
storing at least one application program and a work load value which is required to perform a path rule, wherein the work load value differs depending on the path rule;
receiving a first user utterance associated with execution of a task, through a microphone mounted in the electronic device;
transmitting first data associated with the first user utterance to an external device;
in response to transmitting the first data, receiving a first path rule associated with the execution of the task corresponding to the first user utterance from the external device, wherein the first path rule indicates an order of a plurality of actions to be executed by the at least one application program;
identifying a first work load allocated to the electronic device at a time of receiving the first path rule;
determining, based on the first path rule, an application program associated with the execution of the task;
obtaining, based on the stored work load value and the first path rule, a second work load corresponding to the order of the plurality of actions to be executed by the determined application program;
when the first work load is greater than the second work load, executing the task associated with the first user utterance based on first path rule, in a first performance mode that an operating frequency of a processor is set to a first operating frequency corresponding to the first work load; and
when the first work load is smaller than the second work load, executing the task associated with the first user utterance based on first path rule, in a second performance mode that the operating frequency of the processor is set to a second operating frequency greater than the first operating frequency.

8. The method of claim 7, wherein the second operating frequency corresponds the second work load.

9. The method of claim 7, further comprising: when the execution of the task is completed, operating, by the processor of the electronic device, in the first performance mode.

10. The method of claim 7, further comprising: operating, by the processor of the electronic device, in the first performance mode, at a time before reception of first path rule.

11. The method of claim 10, wherein the executing the task based on first path rule in a second performance mode includes: outputting a user interface associated with execution of the second performance mode at a time before execution of the second performance mode.

* * * * *